(12) United States Patent
Qi et al.

(10) Patent No.: US 12,159,758 B2
(45) Date of Patent: Dec. 3, 2024

(54) ELECTRODE LEADING-OUT METHOD AND PACKAGING METHOD FOR TANTALUM ELECTROLYTIC CAPACITOR

(71) Applicant: Dongguan Sunlord Electronics Co., Ltd., Dongguan (CN)

(72) Inventors: Zhaoxiong Qi, Dongguan (CN); Youyun Li, Dongguan (CN); Taibiao Zeng, Dongguan (CN)

(73) Assignee: Dongguan Sunlord Electronics Co., Ltd., Dongguan (CN)

( * ) Notice: Subject to any disclaimer, the term of this patent is extended or adjusted under 35 U.S.C. 154(b) by 396 days.

(21) Appl. No.: 17/549,812

(22) Filed: Dec. 13, 2021

(65) Prior Publication Data

US 2022/0189707 A1 Jun. 16, 2022

(30) Foreign Application Priority Data

Dec. 14, 2020 (CN) .......................... 202011471035.5
Mar. 2, 2021 (CN) .......................... 202110230566.3

(51) Int. Cl.
| | |
|---|---|
| *H01G 9/048* | (2006.01) |
| *H01G 9/00* | (2006.01) |
| *H01G 9/008* | (2006.01) |
| *H01G 9/08* | (2006.01) |
| *H01G 9/15* | (2006.01) |

(Continued)

(52) U.S. Cl.
CPC ........... *H01G 9/048* (2013.01); *H01G 9/0029* (2013.01); *H01G 9/008* (2013.01); *H01G 9/08* (2013.01); *H01G 9/15* (2013.01); *H01G 13/003* (2013.01); *H01G 13/006* (2013.01); *H01G 9/012* (2013.01); *H01G 2009/05* (2013.01)

(58) Field of Classification Search
None
See application file for complete search history.

(56) References Cited

U.S. PATENT DOCUMENTS

| | | | |
|---|---|---|---|
| 4,571,664 A | * | 2/1986 | Hyland ................. H01G 9/012 29/25.03 |
| 6,236,561 B1 | * | 5/2001 | Ogino ................... H01G 9/012 361/301.3 |

(Continued)

FOREIGN PATENT DOCUMENTS

| | | | | |
|---|---|---|---|---|
| CN | 108335909 A | * | 7/2018 | .......... H01G 9/0003 |
| JP | 5-90096 | | 4/1993 | |

(Continued)

*Primary Examiner* — Scott B Geyer
(74) *Attorney, Agent, or Firm* — Winston Hsu (57) ABSTRACT

Disclosed is an electrode leading-out method and packaging method for a tantalum electrolytic capacitor. The electrode leading-out method includes the following steps: S1, fabricating an insulating protective layer outside an electrode body of the tantalum electrolytic capacitor; S2, exposing a cathode leading-out part on a cathode pre-leading-out part, and exposing a tantalum core leading-out end in an area where a terminal of a tantalum core is located; S3, depositing a metal layer on each of the cathode leading-out part and the tantalum core leading-out end which are exposed; and S4, fabricating an outer electrode for mounting on each of the metal layer of the cathode leading-out part and the metal layer of the tantalum core leading-out end so as to respectively lead out a cathode and an anode.

11 Claims, 8 Drawing Sheets

(51) Int. Cl.
*H01G 13/00* (2013.01)
*H01G 9/012* (2006.01)
*H01G 9/04* (2006.01)

(56) References Cited

U.S. PATENT DOCUMENTS

| | | | | |
|---|---|---|---|---|
| 2003/0081374 | A1* | 5/2003 | Takada | H01G 9/0036 361/523 |
| 2005/0219803 | A1* | 10/2005 | Takatani | H01G 9/15 361/524 |
| 2006/0077618 | A1* | 4/2006 | Fujii | H01G 2/065 361/534 |
| 2007/0242409 | A1* | 10/2007 | Nakamura | H01G 9/012 361/272 |
| 2009/0015988 | A1* | 1/2009 | Kuriyama | H01G 9/14 361/523 |
| 2009/0116173 | A1* | 5/2009 | Shimizu | H01G 9/15 361/523 |
| 2009/0199378 | A1* | 8/2009 | Chacko | H01G 9/15 29/25.03 |
| 2010/0142125 | A1* | 6/2010 | Kim | H01G 9/012 361/533 |
| 2010/0177463 | A1* | 7/2010 | Kurokawa | H01G 9/012 29/25.03 |
| 2010/0232091 | A1* | 9/2010 | Kaneda | C23C 14/08 204/192.15 |
| 2011/0051318 | A1* | 3/2011 | Matsuoka | H01G 9/15 361/523 |
| 2012/0182668 | A1* | 7/2012 | Kim | H01G 9/15 216/13 |
| 2014/0334070 | A1* | 11/2014 | Kobayashi | H01G 9/042 29/25.03 |
| 2015/0155103 | A1* | 6/2015 | Kato | H01G 9/052 361/524 |
| 2016/0189872 | A1* | 6/2016 | Naito | H01G 9/04 29/25.03 |
| 2017/0092430 | A1* | 3/2017 | Uka | H01G 9/0032 |
| 2019/0214199 | A1* | 7/2019 | Ueda | H01G 9/15 |
| 2019/0252127 | A1* | 8/2019 | Paulus | H01G 9/26 |
| 2021/0210289 | A1* | 7/2021 | Shin | H01G 9/012 |
| 2022/0189706 | A1* | 6/2022 | Nagai | H01G 9/08 |

FOREIGN PATENT DOCUMENTS

| | | |
|---|---|---|
| JP | 8-130162 | 5/1996 |
| JP | 2011-108900 A | 6/2011 |

\* cited by examiner

ELECTRODE LEADING-OUT METHOD AND PACKAGING METHOD FOR TANTALUM ELECTROLYTIC CAPACITOR

CROSS REFERENCE TO RELATED APPLICATION

The present application claims priority to Chinese Patent Application No. 202011471035.5, filed on Dec. 14, 2020 and Chinese Patent Application No. 202110230566.3 filed on Mar. 2, 2021, the entire contents of which are incorporated herein by reference.

BACKGROUND OF THE INVENTION

1. Field of the Invention

The present application relates to the technical field of processing technologies of electronic elements, in particular to an electrode leading-out method and a packaging method for a tantalum electrolytic capacitor.

2. Description of the Prior Art

Figure 1:
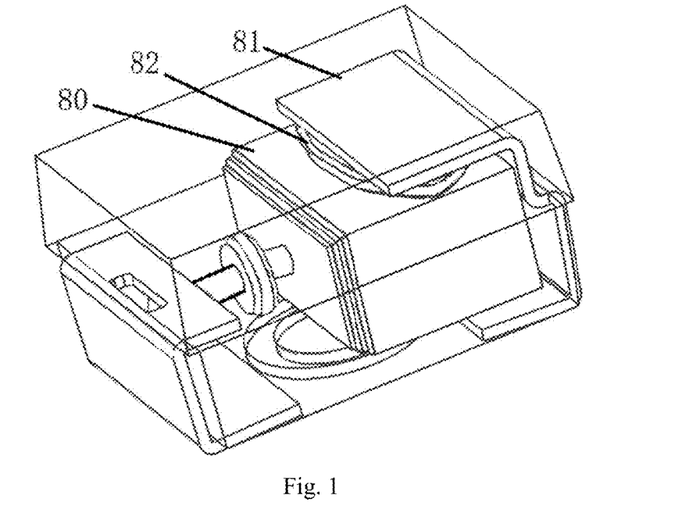
FIG. 1 is a schematic diagram showing a structure of a traditional chip-type electrolytic capacitor.

A traditional chip-type electrolytic capacitor has two leads including an anode lead and a cathode lead which extend out of and are bent to the bottom of a packaging resin main body, and the anode lead and the cathode lead are used for meeting a mounting demand of a printed circuit board. For an electrode leading-out manner of the traditional chip-type electrolytic capacitor, referring to FIG. 1, the capacitor is assembled on a lead frame, a cathode 80 of a capacitor element is adhered to a cathode lead frame 81 by using a conductive silver paste 82, and thus, the cathode of the capacitor is led out; an anode is led out by resistance welding; and then, the capacitor is formed by epoxy resin injection and encapsulation. For the traditional capacitor formed by encapsulation, a tantalum wire with a certain length is required to be reserved to be welded with an anode lead frame to ensure that a welding spot area is sufficiently spaced from the shoulder of a core and avoid short circuit between a welding area and the core, which restricts the design for a height value of the capacitor; next, the design for a demolding angle of a plastic packaging film for the capacitor also restricts the design for the height value of the capacitor; moreover, the thickness of single-sided resin material of six encapsulation surfaces of the capacitor is at least 0.3 mm, the space of the capacitor body (an anode core block) is greatly occupied by the thickness of the resin, and thus, the utilization ratio of the space is very low, which further restricts set values of the capacitor in three directions, that is, a length direction, a width direction and a thickness direction, of the capacitor. Therefore, for the design of a packaging structure of a traditional chip-type solid capacitor, generally, 40-60% of the standard volume of the capacitor can be used only, which results in extremely finite powder filling weight of the capacitor in a finite space, restricts the design capability of the capacitor and is not beneficial to the miniaturization and thickness reduction of the capacitor.

SUMMARY OF THE INVENTION

The main purpose of the present application is to provide an electrode leading-out method for a tantalum electrolytic capacitor to overcome defects in the prior art and solve the problem that an existing electrode leading-out manner of an electrolytic capacitor is low in utilization ratio of space and restricts the miniaturization and thickness reduction of the capacitor.

In order to achieve the aforementioned purpose, the present application adopts the following technical solutions:

An electrode leading-out method for a tantalum electrolytic capacitor, includes the following steps: S1, fabricating an insulating protective layer outside an electrode body of the tantalum electrolytic capacitor; S2, exposing a cathode leading-out part on a cathode pre-leading-out part, and exposing a tantalum core leading-out end in an area where a terminal of a tantalum core is located; and S3, fabricating an outer electrode for mounting, on each of the cathode leading-out part and the tantalum core leading-out end, so as to respectively lead out a cathode and an anode, or depositing a metal layer on each of the cathode leading-out part and the tantalum core leading-out end which are exposed, and fabricating an outer electrode for mounting, on each of the metal layers, so as to respectively lead out a cathode and an anode.

The present application may further adopt the following optional or preferred solutions:

before the insulating protective layer is fabricated in step S1, a conductive bearing substrate is adhered to the cathode pre-leading-out part at the bottom of a cathode layer in advance by using a conductive adhesive; and correspondingly, in step S2, the cathode leading-out part is exposed by peeling off the insulating protective layer on the cathode pre-leading-out part, and the exposed cathode leading-out part is at least partial bottom of the conductive bearing substrate.

The conductive bearing substrate is a metal substrate or a nonmetal substrate with dual sides being printed with electrode patterns, wherein the dual-sided electrode patterns of the nonmetal substrate are connected and conducted by grouting via a pre-buried hole, and the at least partial bottom which is exposed includes electrode patterns.

The nonmetal substrate is one of a ceramic substrate, a glass fiber plate, an epoxy resin plate, a phenolic resin plate, a silicone rubber plate, a BCB plate, a BT resin plate, a polypropylene plate, a polycarbonate plate, a polyvinyl chloride plate, a polyfluortetraethylene plate and a polyurethane plate.

The tantalum core leading-out end is located at the bottom of the electrode body, and a lower end of the electrode body is the tantalum core leading-out end, or the terminal of the tantalum core extends from one end of a tantalum core and is bent to the downside of the bottom of the tantalum core, and a bent part located below the bottom of the tantalum core is the tantalum core leading-out end.

The overall cathode layer is coated by the insulating protective layer, and the tantalum core leading-out end is exposed out of the insulating protective layer.

In step S2, the cathode leading-out part is exposed by peeling off the insulating protective layer on the cathode pre-leading-out part.

In step S2, the cathode leading-out part is exposed by peeling off the insulating protective layer on the cathode pre-leading-out part, and the exposed cathode leading-out part is a part of a silver layer of the cathode.

The present application further provides a packaging method for tantalum electrolytic capacitor, including an electrode leading-out step and a packaging step, wherein any one aforementioned electrode leading-out method is adopted in the electrode leading-out step, and the packaging step is to coat a plastic packaging layer outside the insulating protective layer.

Preferably, after the packaging step is completed, the metal layer deposited on the tantalum core leading-out end is enabled to be flush with the surface of the plastic packaging layer.

The present application has the beneficial effects: according to the electrode leading-out manner in the present application, a part, exposed out of the terminal of the tantalum core, of the anode is used as a leading-out end, the leading-out end is directly or indirectly connected to the outer electrode, and thus, the anode is led out. It is unnecessary to adopt a lead frame for welding to lead out the anode and the cathode, so that it is unnecessary to reserve a greater spacing between a welding spot area and the shoulder of a core, and the insulating protective layer plays a role in preventing the anode and the cathode from being short-circuited. In addition, for the cathode, the leading-out part is directly fabricated on the bottom of the cathode layer. In this way, the space on two ends of the capacitor is saved, and the length and width of the capacitor are both increased under the same standard size defined by the EIA. Therefore, by using the method provided by the present application, the utilization ratio of space in the capacitor may be increased, and under the condition that the weight of a tantalum core block of the anode is constant, the length and the width may be increased, and the thickness may be reduced, which is beneficial to the miniaturization and thickness reduction of the capacitor. Meanwhile, the specific volume of the used tantalum powder is reduced, so that the processing difficulty is lowered. In addition, by increasing the utilization ratio of the internal space under the condition that the appearance size of the capacitor is kept constant, the volume of the tantalum core block can be increased, the electric performance of the capacitor can be improved, and the reliability design margin can be increased.

These and other objectives of the present invention will no doubt become obvious to those of ordinary skill in the art after reading the following detailed description of the preferred embodiment that is illustrated in the various figures and drawings.

DETAILED DESCRIPTION

The present application is further described below in conjunction with the accompanying drawings and specific implementation manners.

A specific implementation manner of the present application provides an electrode leading-out method for a tantalum electrolytic capacitor. The method includes the following steps S1 to S4.

Figure 2:
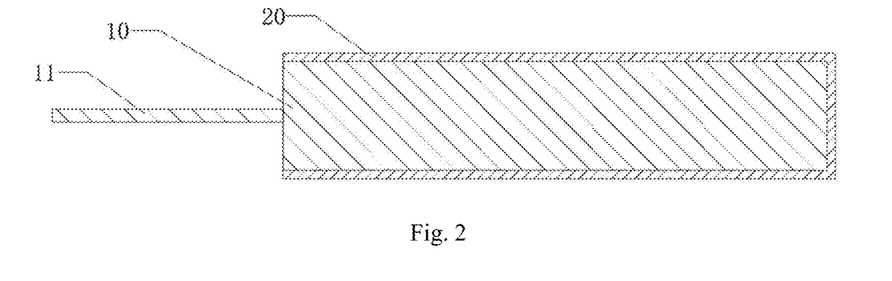
FIG. 2 is a schematic diagram showing an electrode of a tantalum electrolytic capacitor in an embodiment of the present application.
Figure 4:
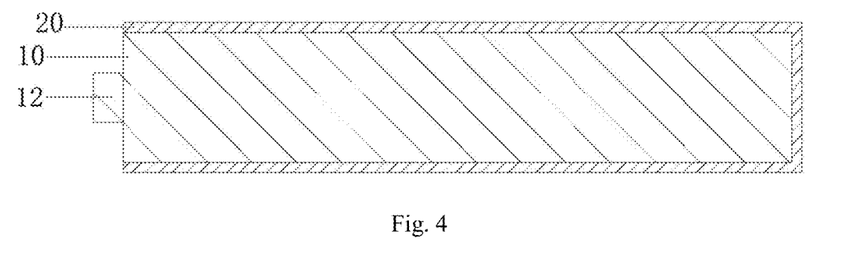
FIG. 4 is a schematic diagram showing an electrode of a tantalum electrolytic capacitor in another embodiment of the present application.
Figure 8:
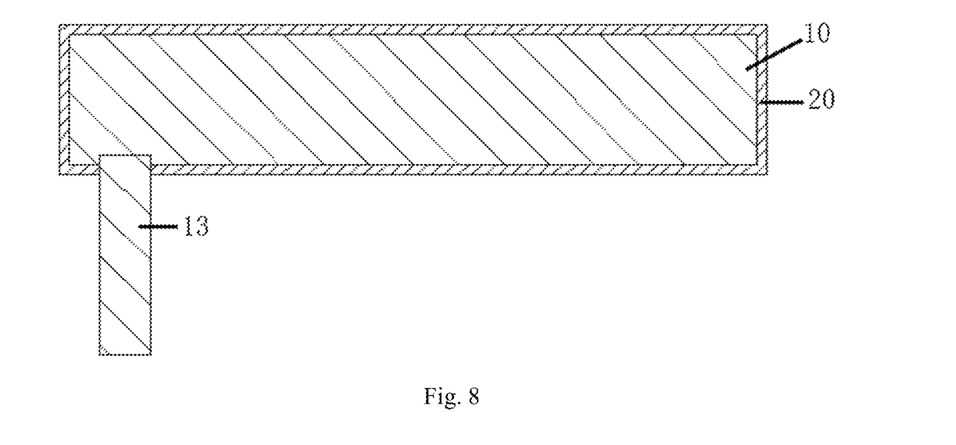
FIG. 8 is a schematic diagram showing an electrode of a tantalum electrolytic capacitor in further embodiment of the present application.

S1, an insulating protective layer is fabricated outside an electrode body of the tantalum electrolytic capacitor. Referring to FIG. 2, FIG. 4 or FIG. 8, the electrode body includes a tantalum core 10 of an anode, a cathode layer 20 (a main body of the cathode layer includes a conductive polymer layer, a graphite layer and a silver layer) and a terminal 11 (or 12, 13) of the tantalum core 10. It should be noted that a dielectric layer (tantalum pentoxide) between the tantalum core 10 and the cathode layer 20 is unshown in the figures, that is, there is the dielectric layer between the tantalum core 10 and the cathode layer 20 in the accompanying drawings, they are not in contact, and the electrode leading-out part is highlighted for only simplifying the figures. On one hand, the insulating protective layer plays a role in isolating lead-out parts of a cathode and an anode, and on the other hand, it plays a role in protecting the capacitor.

S2, a cathode leading-out part is exposed on a cathode pre-leading-out part, and a tantalum core leading-out end is exposed in an area where the terminal of the tantalum core is located. Referring to FIGS. 3A-3G, the cathode pre-leading-out part 50 is located on the end, opposite to the terminal of the tantalum core, on the bottom of the capacitor according to a design demand of a chip capacitor.

S3, a metal layer is deposited on each of the cathode leading-out part and the tantalum core leading-out end which are exposed, for example, a metal such as copper, silver, nickel, tin, palladium, gold, platinum, tantalum and niobium is deposited.

S4, an outer electrode for mounting is fabricated on each of the metal layer of the cathode leading-out part and the metal layer of the tantalum core leading-out end so as to respectively lead out a cathode and an anode. The outer electrodes on two ends are L-shaped electrodes, that is, a part of each electrode is located on an end of the capacitor, the other part is located on a position, close to the end, on the bottom of the capacitor, and the two parts are connected to form an outer electrode.

In the embodiment of the present application, the terminal of the tantalum core may extend out of one end or the bottom of the tantalum core. If the terminal of the tantalum core extends out of one end of the tantalum core, the anode may be directly led out of the end by using the terminal of the tantalum core, or the anode may be led out by bending the terminal of the tantalum core to the bottom. If the terminal of the tantalum core extends out of the bottom of the tantalum core, the anode may be directly led out of the bottom. For the cathode, the cathode may be led out by adopting a conductive bearing substrate or a silver layer of a cathode body. Moreover, in the present application, the anode and the cathode are led out by indirectly or directly covering an anode leading-out end and the cathode leading-out part (a metal layer is deposited in the middle) with the outer electrodes, rather than adopting a lead welding manner.

As shown in FIG. 2 which is a schematic diagram showing an electrode of a tantalum electrolytic capacitor in an embodiment of the present application, a terminal 11 of a tantalum core of the tantalum electrolytic capacitor is led out of the left end of the tantalum core 10. FIGS. 3A-3G_show an exemplary leading-out manner of the electrode as shown in FIG. 2, the leading-out process thereof is shown in FIGS. 3A-3G and includes steps (a1) to (a7).

Figure 3A:
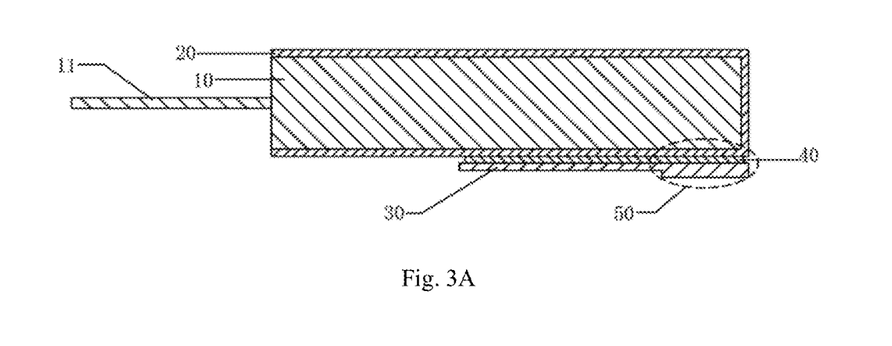
FIGS. 3A-3G are a schematic diagram showing an electrode leading-out method for the tantalum electrolytic capacitor as shown in FIG. 2.

(a1) As shown in FIG. 3A, before the insulating protective layer is fabricated, a conductive bearing substrate 30 is adhered to a cathode pre-leading-out part 50 of a cathode layer in advance by using a conductive adhesive 40. The conductive adhesive 40 is, for example, a conductive silver adhesive; and the conductive bearing substrate 30 is, for example, a metal substrate or a nonmetal substrate with dual sides being printed with electrode patterns, and the dual-sided electrode patterns are connected and conducted by grouting via a pre-buried hole. In addition, the side, close to the end of the capacitor, on the bottom of the conductive bearing substrate 30 may be set to have a boss for facilitating subsequent processes of peeling-off, metal deposition and outer electrode fabrication. The nonmetal substrate may be one of a ceramic substrate, a glass fiber plate, an epoxy resin plate, a phenolic resin plate, a silicone rubber plate, a BCB plate, a BT resin plate, a polypropylene plate, a polycarbonate plate, a polyvinyl chloride plate, a polyfluortetraethylene plate and a polyurethane plate.

Figure 3B:
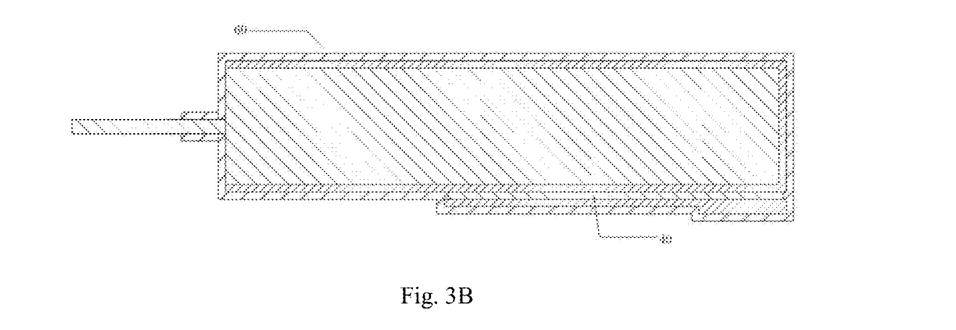

(a2) As shown in FIG. 3B, after step (a1) is completed, an insulating layer 60 is sprayed outside the electrode body. The spraying thickness is 1 μm to 200 μm, preferably, the thickness is 5 μm to 50 μm, and a spraying material includes synthetic resin and/or a polymer material; and the overall cathode layer (including the conductive bearing substrate adhered to the bottom of the cathode layer), the exposed end of the tantalum core 10 and the root of the terminal 11 of the tantalum core are coated by the sprayed insulating layer 60.

Figure 3C:
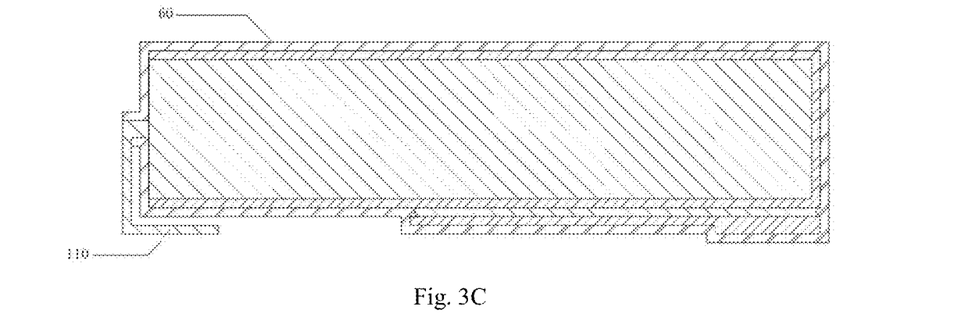

(a3) As shown in FIG. 3C, after spraying is completed, the terminal 11 of the tantalum core is bent from a root position which is not coated by the insulating layer 60 to the downside of the bottom of the tantalum core 10, and the bottom is a tantalum core leading-out end 110. It may be seen that the terminal 11 of the tantalum core is bent to the bottom and is closer to the bottom of the cathode layer, and therefore, at the moment, the insulating layer 60 favorably plays a role in avoiding the situation that the cathode and the anode are short-circuited.

Figure 3D:
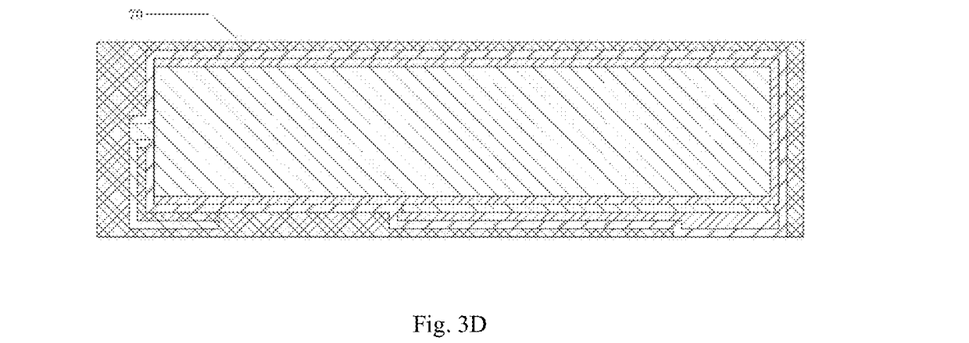

(a4) As shown in FIG. 3D, module packaging is performed, that is, modules after completing step (a3) are integrally packaged by adopting an existing manner and material, and how to perform packaging is not repeated herein. The overall electrode body is coated by a plastic packaging layer 70 formed by packaging, preferably, the insulating layer 60 may be exposed on the cathode pre-leading-out part 50 during packaging.

Figure 3E:
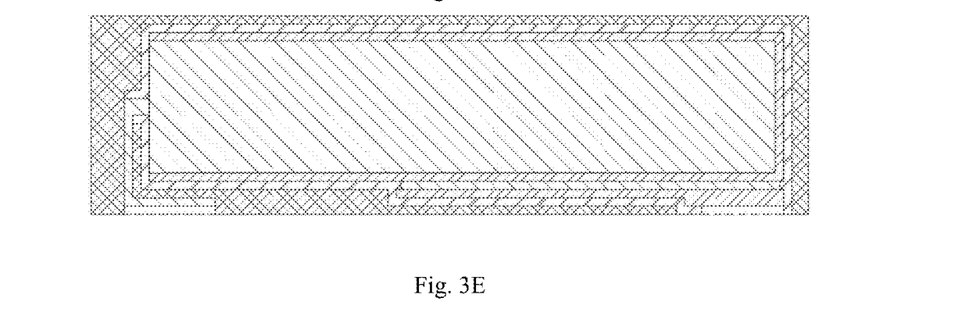

(a5) As shown in FIG. 3E, peeling-off is performed, that is, the plastic packaging layer 70 (if the overall insulating layer 60 is coated by the plastic packaging layer) and the insulating layer 60 are successively peeled off on the cathode pre-leading-out part 50 to expose at least partial bottom of the conductive bearing substrate 30, that is, the cathode leading-out part; and if the conductive bearing substrate is the nonmetal substrate, the exposed bottom correspondingly includes electrode patterns. Meanwhile, the plastic packaging layer is peeled off on an area where the tantalum core leading-out end 110 is located so as to expose the tantalum core leading-out end 110.

Figure 3F:
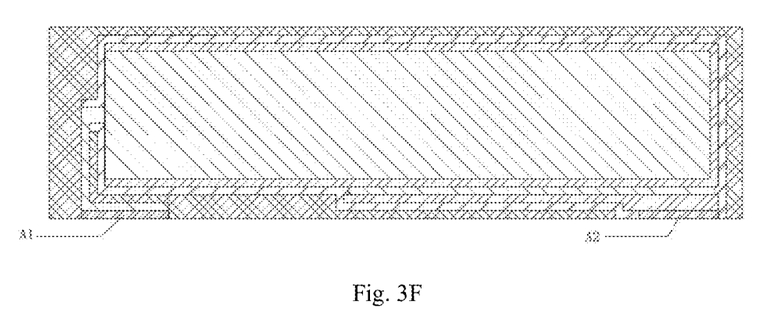

(a6) As shown in FIG. 3F, a metal layer A1 is deposited on the exposed tantalum core leading-out end 110, and a metal layer A2 is deposited on the exposed cathode leading-out part.

Figure 3G:
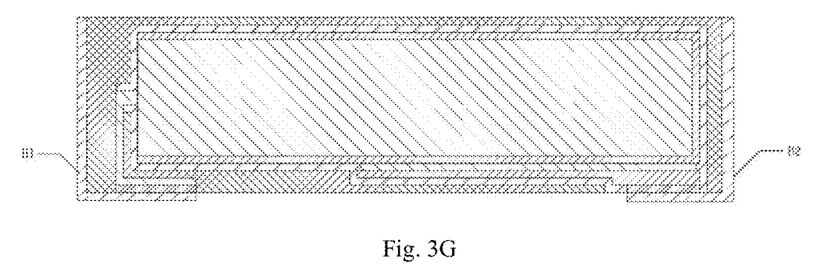

(a7) As shown in FIG. 3G, mounting electrodes, that is, a pair of outer electrodes B1 and B2, of the capacitor are fabricated in a manner such as electroplating. During fabrication, the outer electrode B1 covers the metal layer A1, and the outer electrode B2 covers the metal layer A2, so that the outer electrodes B1 and B2 are respectively in contact connection with the metal layers A1 and A2, and then, the anode and the cathode are led out.

It may be seen from the aforementioned embodiments that compared with the prior art, the electrode leading-out method in the embodiment of the present application can save a reservation space for a welding spot brought by a welding manner and ensure that the utilization ratio of the space of the capacitor is increased. Specifically, in an existing anode leading-out manner, a spacing which is 1 mm at least is required to be reserved between a welding spot area and the shoulder of a core; and in the present application, adopted is a manner that the terminal of the tantalum core is directly bent to form the tantalum core leading-out end, and then, the leading-out end is deposited with the metal and is electroplated with the outer electrodes, and therefore, the length of the root, which is required to be remained for bending, of the terminal of the tantalum core is only about 5 μm to 100 μm, and preferably, the length is 10 μm to 50 μm.

As shown in FIG. 4 which is a schematic diagram showing an electrode of a tantalum electrolytic capacitor in another embodiment of the present application, a terminal 12 of a tantalum core of the tantalum electrolytic capacitor is led out of the left end of the tantalum core 10. FIGS. 5A-5D show an exemplary leading-out manner of the electrode as shown in FIG. 4, the manner is the same as that in the aforementioned embodiments, except that an anode leading-out structure is directly fabricated at the left by using the terminal 12 of the tantalum core, and accordingly, a cathode may be led out of the bottom by directly using a silver layer, rather than adopting a bearing substrate. The leading-out process is shown in FIGS. 5A-5D and includes steps (b1) to (b4).

Figure 5A:
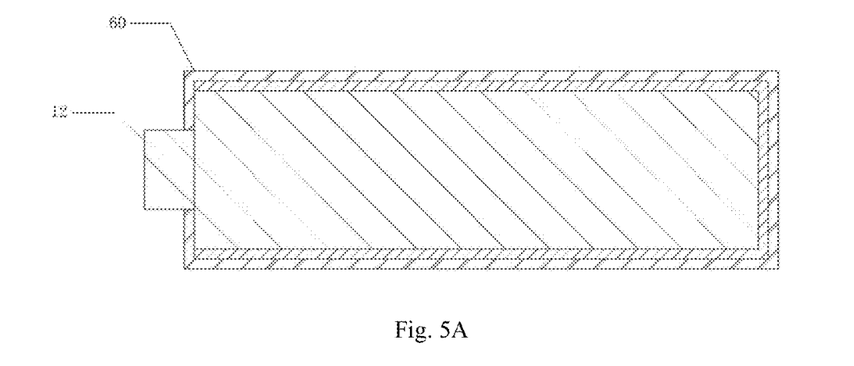
FIGS. 5A-5D are a schematic diagram showing an electrode leading-out method for the tantalum electrolytic capacitor as shown in FIG. 4.

(b1) As shown in FIG. 5A, insulating spraying is performed directly on an electrode body to form an insulating layer 60.

Figure 5B:
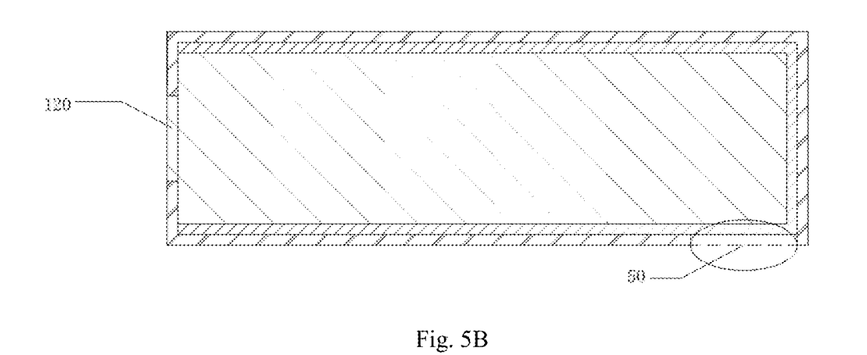

(b2) As shown in FIG. 5B, the terminal of the tantalum core is cut to make an exposed end face of the terminal flush with the surface of the insulating layer 60, so that a tantalum core leading-out end 120 is formed on the end face; in addition, the insulating layer on a cathode pre-leading-out part 50 is peeled off to expose a cathode leading-out part.

Figure 5C:
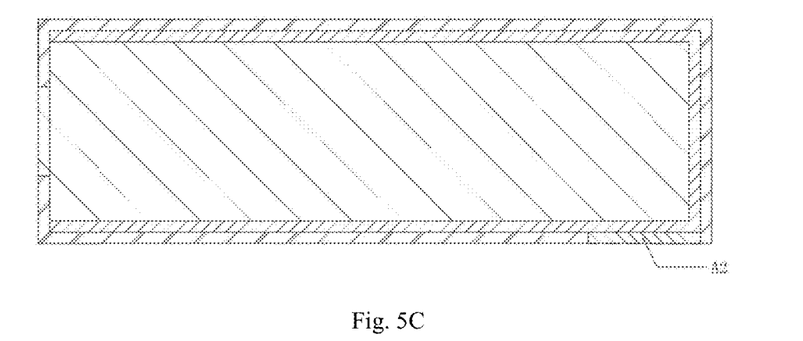

(b3) As shown in FIG. 5C, the tantalum core leading-out end 120 of the anode has been flush with the insulating layer 60, and therefore, it is possible that no metal layers are deposited; and a meta layer A2 is only deposited on the cathode leading-out part, and the deposited metal layer A2 is flush with the surface of a cathode layer.

Figure 5D:
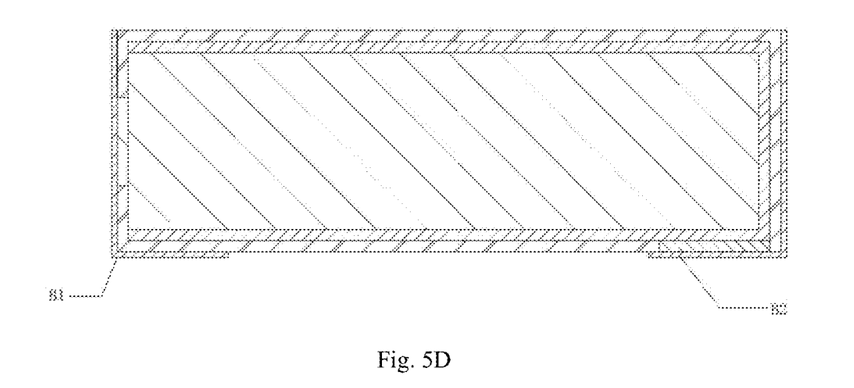
Figure 6A:
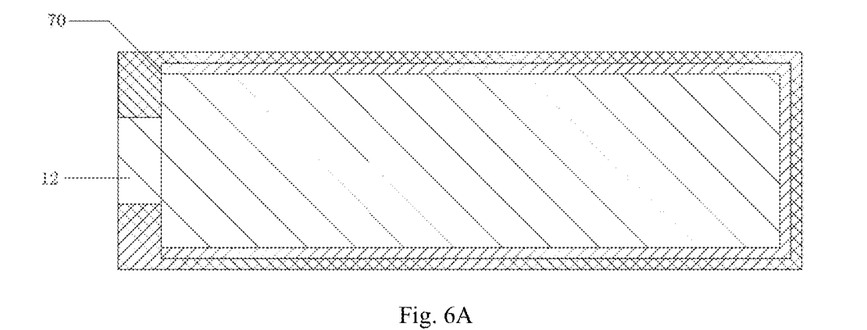
FIGS. 6A-6D are a schematic diagram showing another electrode leading-out method for the tantalum electrolytic capacitor as shown in FIG. 4.
Figure 6B:
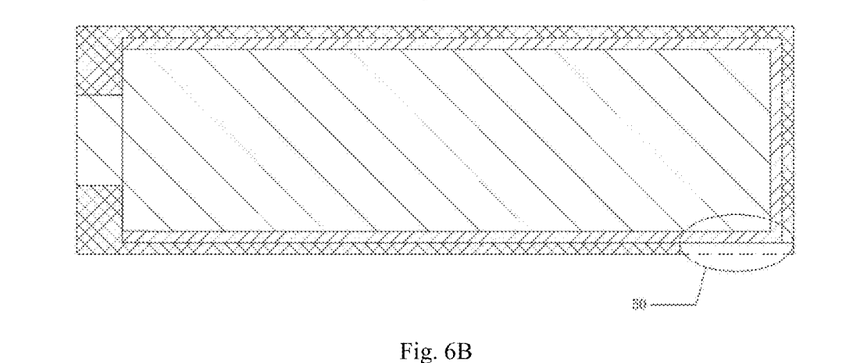
Figure 6C:
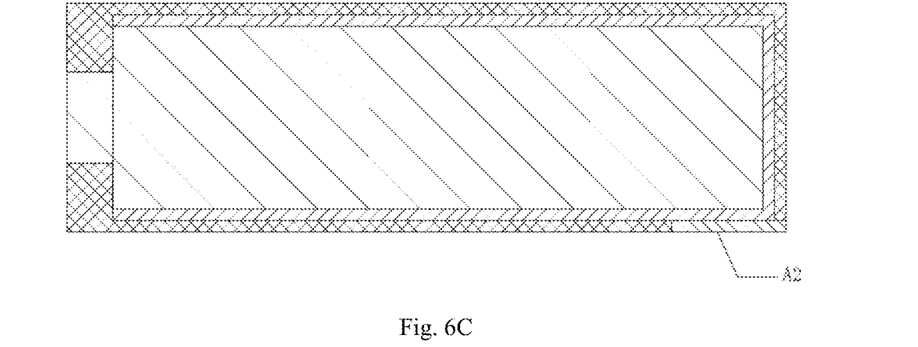
Figure 6D:
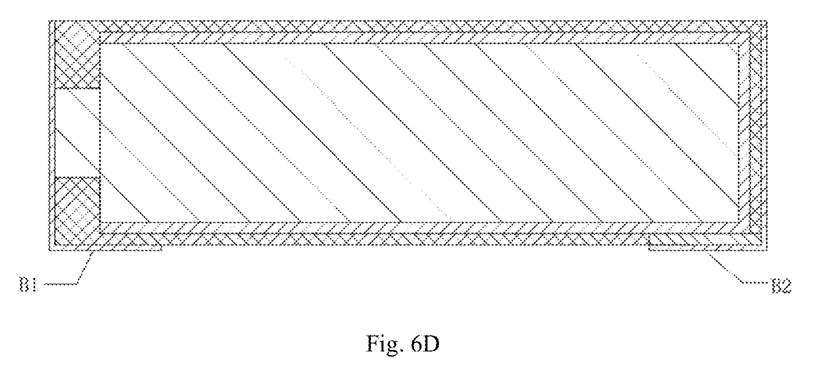

(b4) As shown in FIG. 5D, outer electrodes B1 and B2 are fabricated, wherein the part, located on the end of the capacitor, of the outer electrode B1 coats the tantalum core leading-out end 120 to lead out an anode, and the part, located on the bottom of the capacitor, of the outer electrode B2 coats the metal layer A2 to lead out a cathode.

FIGS. 6A-6D show another exemplary leading-out manner of the electrode as shown in FIG. 4, the leading-out process thereof is shown in FIGS. 6A-6D and includes steps (c1) to (c4). The manner is the same as that as shown in FIGS. 5A-5D, except that the terminal of the tantalum core is cut according to a certain size, then, overall packaging is performed, and the thickness of a plastic packaging layer 70 for packaging is equal to the length of the terminal, remained after cutting, of the tantalum core, that is, a cutting end face of the terminal of the tantalum core is flush with the surface of the plastic packaging layer 70.

Figure 7A:
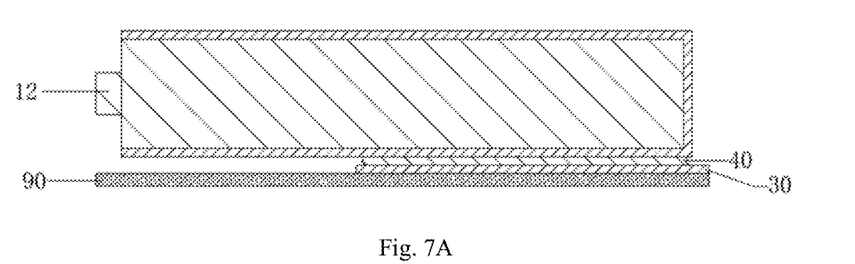
FIGS. 7A-7C are a schematic diagram showing further electrode leading-out method for the tantalum electrolytic capacitor as shown in FIG. 4.
Figure 7B:
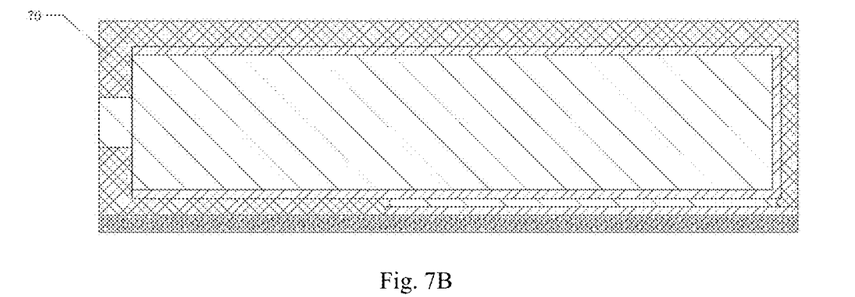
Figure 7C:
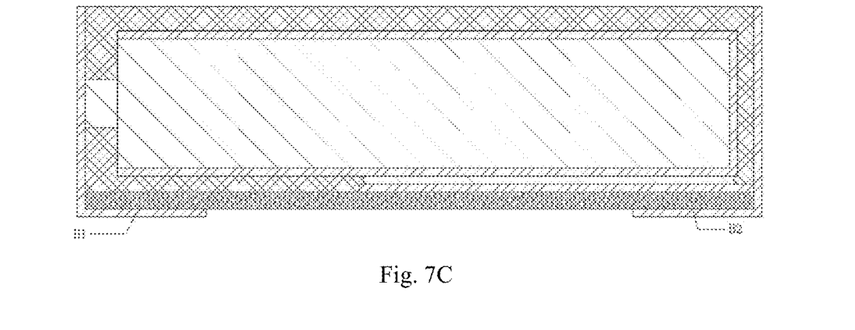

FIGS. 7A-7C show further exemplary leading-out manner of the electrode as shown in FIG. 4, the leading-out process thereof is shown in FIGS. 7A-7C and includes steps (d1) to (d3).

(d1) As shown in FIG. 7A, a conductive bearing substrate 30 is adhered to a cathode pre-leading-out part at the bottom of a cathode layer by using a conductive adhesive 40, and then, an overall substrate 90 of the capacitor is fabricated below the conductive bearing substrate 30, wherein the main purpose of the substrate 90 is to ensure that the cathode dissipates heat better.

(d2) As shown in FIG. 7B, module packaging is performed, the formed plastic packaging layer 70 is flush with a tantalum core leading-out end cut in advance.

(d3) As shown in FIG. 7C, outer electrodes are fabricated, the outer electrode B1 covers the tantalum core leading-out end to lead out an anode, and the outer electrode B2 is connected with one side of the conductive bearing substrate to lead out a cathode.

As shown in FIG. 8 which is a schematic diagram showing an electrode of a tantalum electrolytic capacitor in further embodiment of the present application, a terminal 13 of a tantalum core of the tantalum electrolytic capacitor is led out of the bottom of the tantalum core 10, and an anode will be directly led out of the bottom in the present embodiment. FIGS. 9A-9E show an exemplary leading-out manner of the electrode as shown in FIG. 8, as shown in FIGS. 9A-9E, the leading-out process includes steps (e1) to (e5).

Figure 9A:
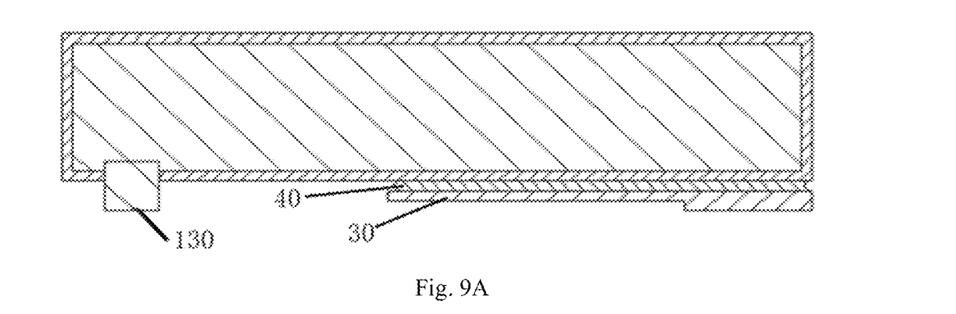
FIGS. 9A-9E are a schematic diagram showing an electrode leading-out method for the tantalum electrolytic capacitor as shown in FIG. 8.

(e1) As shown in FIG. 9A, a conductive bearing substrate 30 is adhered to an area of a cathode pre-leading-out part 50 at the bottom of a cathode layer by using a conductive adhesive 40, and meanwhile, the terminal 13 of the tantalum core needs to be cut, so that the phenomenon that the terminal 13 of the tantalum core is protruded out of the conductive bearing substrate 30 in a horizontal direction to form a tantalum core leading-out end 130 is avoided.

Figure 9B:
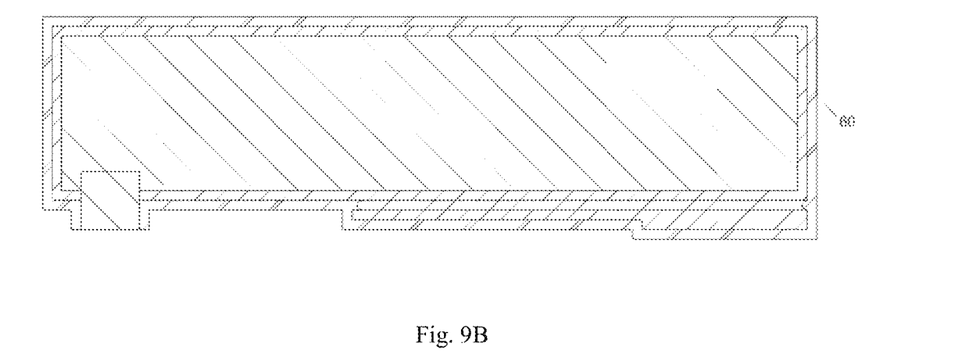

(e2) As shown in FIG. 9B, an insulating layer 60 is sprayed outside the overall electrode body formed above, the overall cathode layer (including the conductive bearing substrate) is coated by the insulating layer 60, the tantalum core leading-out end 130 is exposed only, and the tantalum core leading-out end 130 is flush with the surface of the insulating layer 60.

Figure 9C:
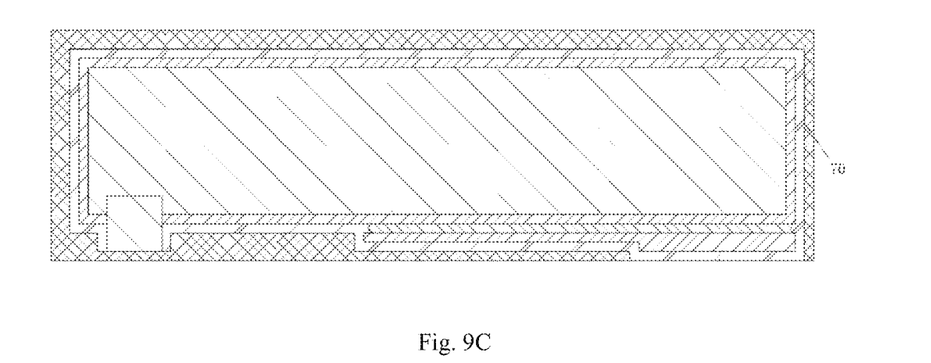

(e3) As shown in FIG. 9C, module packaging is performed outside the insulating layer 60 to form a plastic packaging layer 70, which is similar to that in the embodiment as shown in FIG. 3D.

Figure 9D:
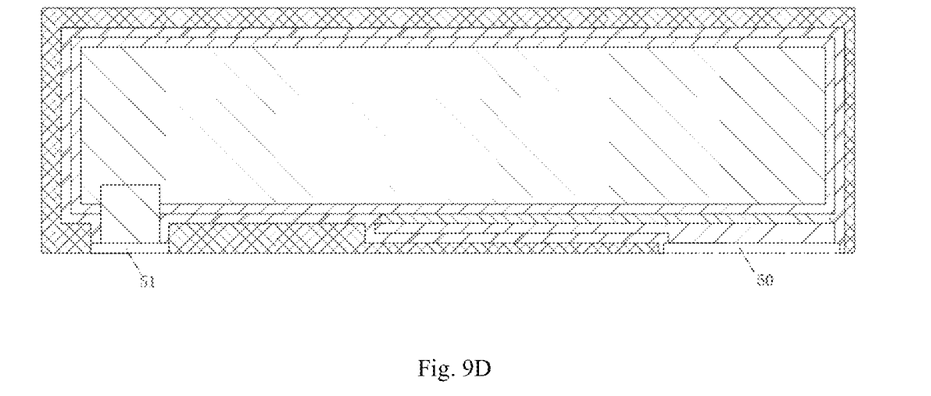

(e4) As shown in FIG. 9D, peeling-off is performed, that is, peeling-off is performed in the same manner as the step (a5) in the embodiment as shown in FIG. 3E.

Figure 9E:
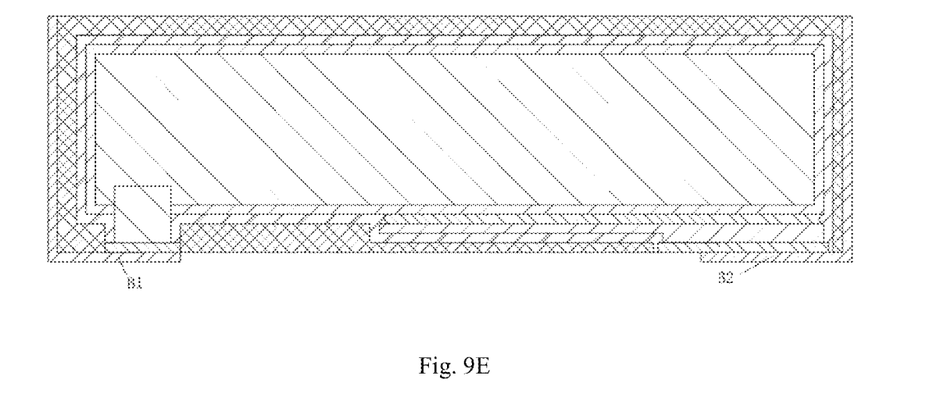

(e5) As shown in FIG. 9E, metal layers are deposited, and outer electrodes are fabricated, that is, the metal layers are deposited in the same manner as the step (a6) in the embodiment as shown in FIG. 3F, and the outer electrodes are fabricated in the same manner as the step (a7).

In a word, by using the electrode leading-out method provided by the present application, the utilization ratio of the space in the capacitor can be increased, and the volume of the tantalum core of the anode can be increased under the condition that the height of the capacitor is reduced or kept constant, so that the electric performance of the capacitor is improved, and the miniaturization and thickness reduction of the capacitor are further achieved.

The aforementioned contents are further detailed descriptions of the present application in conjunction with the specific preferred implementation manners, but cannot affirm that the specific implementation of the present application is only limited to these descriptions. The skilled in the art to which the present application belongs may further make several equivalent replacements or obvious modifications without departing from the concept of the present application, and those of which the performances or applications are the same should be regarded to fall within the protective scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrode leading-out method for a tantalum electrolytic capacitor, comprising the following steps:
    S1, fabricating an insulating protective layer outside an electrode body of the tantalum electrolytic capacitor;
    S2, exposing a cathode leading-out part on a cathode pre-leading-out part, and exposing a tantalum core leading-out end in an area where a terminal of a tantalum core is located; and
    S3, fabricating an outer electrode for mounting, on each of the cathode leading-out part and the tantalum core leading-out end, so as to respectively lead out a cathode and an anode, or
    depositing a metal layer on each of the cathode leading-out part and the tantalum core leading-out end which are exposed, and fabricating an outer electrode for mounting, on each of the metal layers, so as to respectively lead out a cathode and an anode;
    wherein before the insulating protective layer is fabricated in step S1, a conductive bearing substrate is adhered to the cathode pre-leading-out part at the bottom of a cathode layer in advance by using a conductive adhesive; and correspondingly, in step S2, the cathode leading-out part is exposed by peeling off the insulating protective layer on the cathode pre-leading-out part, and the exposed cathode leading-out part is at least partial bottom of the conductive bearing substrate.

2. The electrode leading-out method for the tantalum electrolytic capacitor of claim 1, wherein the conductive bearing substrate is a metal substrate or a nonmetal substrate with dual sides being printed with electrode patterns, wherein the dual-sided electrode patterns of the nonmetal substrate are connected and conducted by grouting via a pre-buried hole, and the at least partial bottom which is exposed comprises electrode patterns.

3. The electrode leading-out method for the tantalum electrolytic capacitor of claim 2, wherein the nonmetal substrate is one of a ceramic substrate, a glass fiber plate, an epoxy resin plate, a phenolic resin plate, a silicone rubber plate, a BCB plate, a BT resin plate, a polypropylene plate, a polycarbonate plate, a polyvinyl chloride plate, a polyfluortetraethylene plate and a polyurethane plate.

4. The electrode leading-out method for the tantalum electrolytic capacitor of claim 1, wherein the tantalum core leading-out end is located at the bottom of the electrode body, and a lower end of the electrode body is the tantalum core leading-out end, or the terminal of the tantalum core extends from one end of a tantalum core and is bent to the downside of the bottom of the tantalum core, and a bent part located below the bottom of the tantalum core is the tantalum core leading-out end.

5. The electrode leading-out method for the tantalum electrolytic capacitor of claim 4, wherein the overall cathode layer is coated by the insulating protective layer, and the tantalum core leading-out end is exposed out of the insulating protective layer.

6. The electrode leading-out method for the tantalum electrolytic capacitor of claim 5, wherein in step S2, the cathode leading-out part is exposed by peeling off the insulating protective layer on the cathode pre-leading-out part.

7. A packaging method for a tantalum electrolytic capacitor, comprising an electrode leading-out step and a packaging step, wherein the electrode leading-out method of claim 1 is adopted in the electrode leading-out step, and the packaging step is to coat a plastic packaging layer outside the insulating protective layer.

8. The packaging method for the tantalum electrolytic capacitor of claim 7, wherein after the packaging step is completed, the metal layer deposited on the tantalum core leading-out end is enabled to be flush with the surface of the plastic packaging layer.

9. An electrode leading-out method for the tantalum electrolytic capacitor, comprising the following steps:

S1, fabricating an insulating protective layer outside an electrode body of the tantalum electrolytic capacitor;

S2, exposing a cathode leading-out part on a cathode pre-leading-out part, and exposing a tantalum core leading-out end in an area where a terminal of a tantalum core is located; and S3, fabricating an outer electrode for mounting, on each of the cathode leading-out part and the tantalum core leading-out end, so as to respectively lead out a cathode and an anode, or depositing a metal layer on each of the cathode leading-out part and the tantalum core leading-out end which are exposed, and fabricating an outer electrode for mounting, on each of the metal layers, so as to respectively lead out a cathode and an anode;

wherein in step S2, the cathode leading-out part is exposed by peeling off the insulating protective layer on the cathode pre-leading-out part, and the exposed cathode leading-out part is a part of a silver layer of the cathode.

10. A packaging method for a tantalum electrolytic capacitor, comprising an electrode leading-out step and a packaging step, wherein the electrode leading-out method of claim 9 is adopted in the electrode leading-out step, and the packaging step is to coat a plastic packaging layer outside the insulating protective layer.

11. The packaging method for the tantalum electrolytic capacitor of claim 10, wherein after the packaging step is completed, the metal layer deposited on the tantalum core leading-out end is enabled to be flush with the surface of the plastic packaging layer.

* * * * *